SUPERCONDUCTIVE MEANS FOR OBTAINING HIGH MAGNETIC FIELDS

Filed July 1, 1963 2 Sheets-Sheet 1

INVENTOR
DAVID L. ATHERTON
BY R. L. Westell
PATENT AGENT

SUPERCONDUCTIVE MEANS FOR OBTAINING HIGH MAGNETIC FIELDS

Filed July 1, 1963 2 Sheets-Sheet 2

INVENTOR
DAVID L. ATHERTON
BY R. L. Westell
PATENT AGENT

United States Patent Office 3,233,155

Patented Feb. 1, 1966

3,233,155

SUPERCONDUCTIVE MEANS FOR OBTAINING HIGH MAGNETIC FIELDS

David L. Atherton, Toronto, Ontario, Canada, assignor to Ferranti-Packard Electric Limited, Toronto, Ontario, Canada Filed July 1, 1963, Ser. No. 291,886
7 Claims. (Cl. 317—158)

This invention relates to means for and a method of obtaining high magnetic fields using superconducting materials.

By superconducting materials are meant those materials which when cooled to temperatures of approximately 0–20° K. (the temperature varies with the material), exhibit no measurable electrical resistance below certain values of magnetic fields adjacent them. When a superconducting material is in a superconducting state, it is, except for surface effects, impenetrable by magnetic flux but when the material changes from a superconducting to a non-superconducting state (known as the "normal" state), at the same time it becomes penetrable by magnetic flux.

By "flux penetrable area" is implied a through path for flux along a path surrounded by superconducting material.

The value of magnetic field at 0° K. at which superconducting material becomes normal is known as the "critical field," and it will be appreciated that the value of the critical field must be obtained by extrapolation from experimental results at other temperatures since the temperature 0° K. is not attainable. The temperature at zero magnetic field, above which superconducting material becomes normal is known as the "critical temperature." Although these are the proper definitions, of the terms "critical field" and "critical temperature" for convenience herein the term "critical field" used to refer to the field above which the superconducting material will become normal at the then ambient temperature, while the term "critical temperature" is used to refer to the temperature at which superconducting material becomes normal in a given field.

With bodies made of superconducting alloys it is found in some cases that for currents in the body above a certain value, the body goes normal even though the ambient temperature and field are below their critical values. The current value at which this takes place is known as the critical current.

The invention applies to any superconducting materials. Some of these are listed in a book "Cryogenic Engineering" by Russell B. Scott, D. Van Nostrand Company Inc., 1960, at page 342.

It is known to produce magnetic fluxes of high density by providing a solid body of potentially superconducting material having two apertures therethrough. With the body cooled to a super-conducting state, a magnetic field is provided at the body. The superconductivity of material bordering on only a first one of the apertures is then temporarily destroyed, allowing the flux from the field to enter such one aperture. The material extending about the first aperture is then made completely superconducting whereby flux is trapped therein. A superconducting piston of slightly less diameter than the first aperture is inserted therein and during the time such piston is in place, the superconductivity is destroyed temporarily, only between the first and second apertures. Most of the trapped flux is then moved into the second aperture since the field will equalize between the second aperture and the small space about the piston. The superconductivity is then restored between the first and the second aperture. The above described process may then be repeated a number of times, the flux may be increased in density in the second aperture up to the limit set by the ability of the material bordering the second aperture to maintain its superconductivity under the then existing conditions of induced current in the superconductor and ambient fields and temperature conditions up to the limits set by the compression ratio of the piston and the external field. Such a device is known as and referred to herein as a flux pump.

Such a flux pump has been successful in producing flux density being in the neighbourhood of 20 kilogauss before the superconductivity is destroyed. Such a field is less than the field obtained with superconducting solenoids where 50–60 kilogauss have been obtained.

It is an object of this invention to provide means utilizing a flux pump wherein higher flux densities are obtainable than with previous flux pumps.

It is an object of this invention to provide means providing a plurality of flux penetrable areas separated from each other by superconducting material and wherein the areas are arranged to reach various levels of flux density and are located so that an area designed to have a certain such level borders only upon areas designed to have the next higher or lower level of flux density.

It is an object of this invention to provide means and a method wherein a flux pump is maintained in an environment of high magnetic field, whereby the flux densities obtained in the flux pump are separated by superconducting material from flux densities of intermediate value and these are in turn separated by superconducting material from the external field.

It is an object of this invention to provide means and a method wherein superconducting material is used to delineate flux penetrable areas one from another and wherein the areas and the superconducting material are so arranged that, while there is only a predetermined flux density differential across a given extent of superconducting material, the areas are so arranged, that with such flux density differential, the flux density can increase in steps from lower values in outwardly located areas to higher values in inwardly located areas; the highest flux density being higher than the flux density differential across a given superconducting extent.

In this way, higher flux densities are achievable than with existing flux pumps and existing materials, and high flux densities are more readily and economically obtained than with superconducting electromagnets constructed of long lengths of fine wire, since the device, in accord with the invention, may be constructed of relatively short, relatively thick, lengths of superconductor. Moreover, the device in accord with the invention is less prone to overall failure due to loss of superconductivity in a localized superconductor extent than is a superconducting wire electromagnet constructed with long length of wire.

Further the design of the invention lends itself to flexibility in design for non-uniform or of focussed fields and the inventive design is simpler to design and maintain.

In drawings which illustrate a preferred embodiment of the invention:

Figure 1:
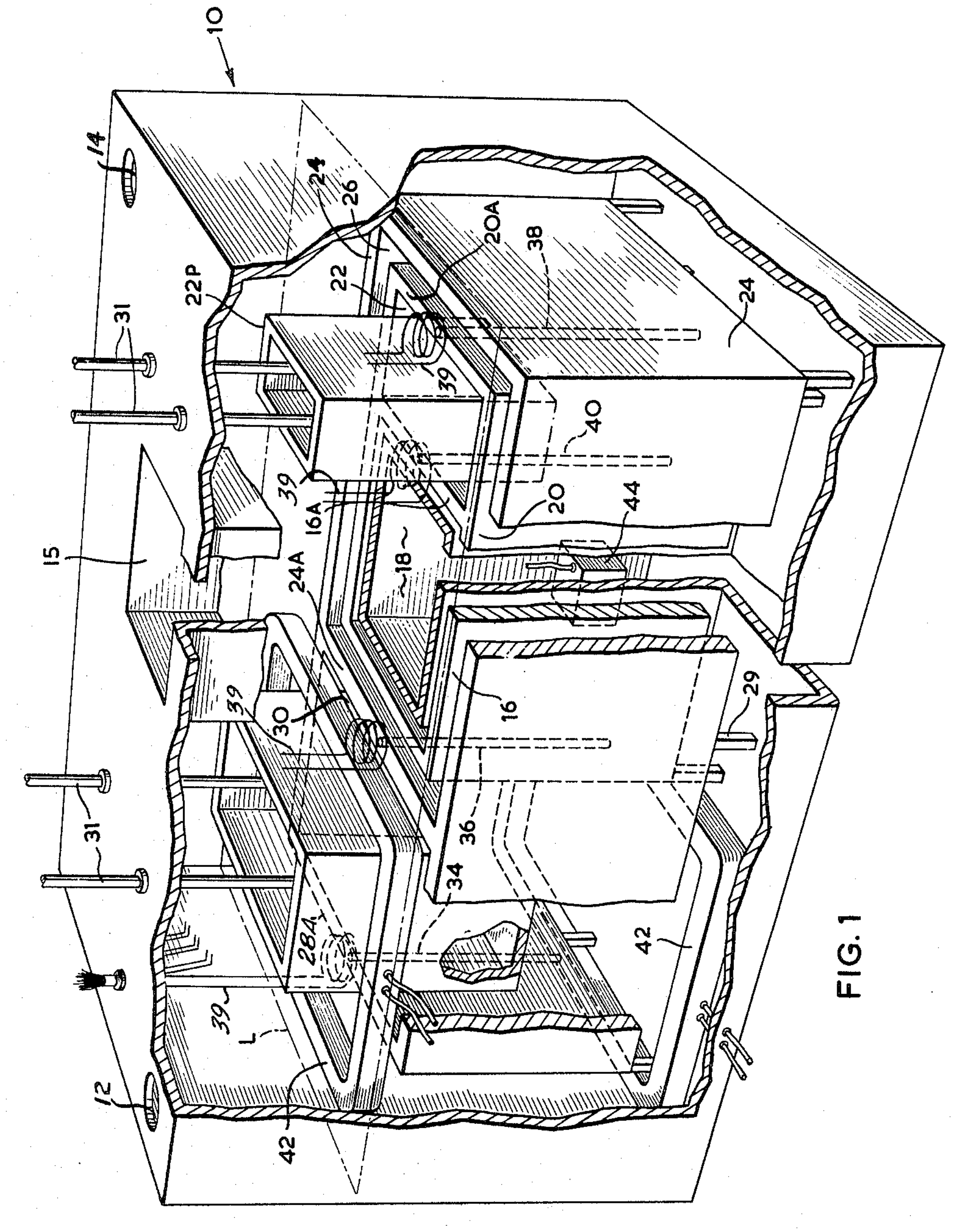
FIGURE 1 is a perspective view of a preferred embodiment of the invention.

A closed and well insulated tank 10 is provided with supply and return ports 12 and 14 from a helium source not shown to maintain liquid helium in the tank to level "L" to provide the cooling necessary to maintain the superconducting material in its desired state. If the high flux density field is desired to be used exteriorly of the tank then, as shown in FIGURE 1, a passage 15 is constructed passing through the tank, at approximately the centre, and insulated from the interior thereof.

In describing the arrangement of the superconducting material and flux penetrable areas, it will be understood that the terms "central," "inner" and "outer" are relative terms only and do not denote exact geometrical locations but merely the location of areas relative to each other and to the outer periphery of the outermost superconducting extent.

Looking at the device in plan view including the area encompassed by tube 15, superconducting material 16 defines a central flux penetrable area 18 in which the highest flux density is to be created. The tube formed by superconductor material 16, is rectangular in plan view but might be circular or otherwise shaped. The tube 16 is open at the top and the bottom to provide a through path for flux in the area 18. An extent of superconducting material 20 and 20A, defines with an extent 16A of the superconducting material 16, a flux penetrable area 22. Since extent 20 and extent 16 must have a superconducting junction then a very good joint must be made, but for practical considerations it will usually be more practical to construct an integral superconducting member having the flux penetrable areas 18 and 22 therein. Mathematically, a body having no holes therein will be spoken of as a "singly connected member" and a body having one hole therein would be spoken of as a "doubly connected member" and therefore will be understood that the superconducting member incorporating superconducting extents 16, 16A, 20 and 20A will be spoken of as a triply connected member. Still looking at the device in plan view an extent of superconducting material 24 will extend around the outer periphery of the superconducting extents 16, 20 and 20A, but spaced therefrom to define a flux penetrable area 26 therebetween. One extent 24A of superconductor 24 will in common with the further extent 28 and 28A define a superconductor area 30. Since the same conductivity considerations apply to superconducting extents 24, 24A, 28 and 28A as to extents 16, 16A, 20 and 20A, then it will be understood that superconducting extents 24 and 28 are preferably made in the form of an integral triply connetced member. The superconducting members 16, 20, 24, 28 are maintained in their desired spatial relationship to one another, preferably either by support from the bottom of the tank or by support from the top. As shown these members are in the preferred embodiment supported from the tank bottom on legs 29. Superconducting pistons 30P and 22P are designed to have a shape and tolerance to be received in the areas 30 and 22 respectively, but to be enough smaller in dimensions to allow easy raising and lowering thereof. Raising and lowering means for the pistons operable from outside the tank are provided and examples of such means are indicated at 31. Mechanical connections for such means which pass through the tank walls, must be carefully sealed and designed to ensure as little heat leakage into the tank, as possible. The pistons 22P and 30P may be solid or hollow as shown and when lowered into the areas 22 or 30, in superconducting state, flux trapped in the area is compressed between the outer periphery of the piston and the inner periphery of the superconductor extents defining the area.

Figure 2:
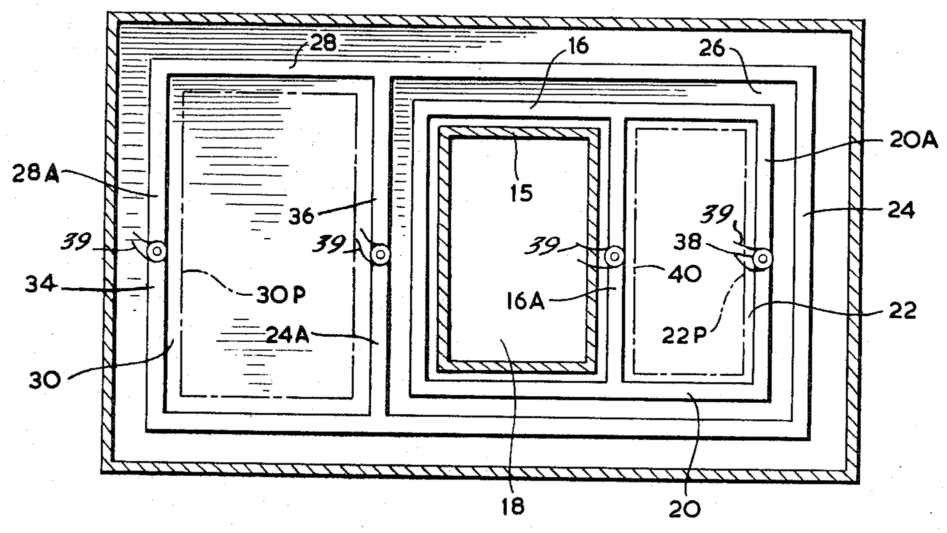
FIGURE 2 is a plan view of the device of FIGURE 1.

In the preferred embodiment of FIGURES 1 and 2, a heating wire 34 is embedded in one of the extents 28A of the superconductor 28 delineating the exterior of the outer triply connected body formed by extents 24, 24A, 28 and 28A from area 30; heating wire 36 is embedded in the superconducting extent 24A between area 30 and area 26; a heating wire 38 is incorporated in a superconductor extent 20A separating area 26 and area 22 and a heating wire 40 is embedded in the superconductor extent 16A between area 22 and area 18.

In the operation of the device being described, the current in the four heating wires must be switched on and off and the wires given time to heat or cool as the case may be as desired to control the state of the superconductors which separate flux penetrable areas. The switching and electric supply means are easily constructed and raise no design problems and hence are not shown.

Means must be provided adapted to produce in area 30 a field when extent 28A is normal and in the preferred embodiment below and above area 30 and either inside or outside the tank, is located a pair of solenoid coils 42 (to be energized by a power source, not shown) designed to provide a field, below either or both area 30 and the area outside superconductor 28. A probe 44 for measuring the high flux density field may be provided.

In operation the device so far described would be used as follows:

With the helium in the tank at level "L" cooling the superconductor so that all superconductors are in their superconducting state, a magnetic field is supplied by solenoid coil 42. Such field will exist outside of area 30 but would not exist inside in view of the superconductivity of the extents 28, 28A and 24A, since in this state the flux cannot pass through the walls.

With the field from solenoid 42, "on," pistons 22P and 30P out of areas 22 and 30 respectively, and superconductors in their superconducting state, heat is applied by an electrical current in wire 34 causing superconductivity to be destroyed in a localized extent of wall 28A whereby flux from the external field is provided in area 30. When this is done the current in wire 34 is switched off and extent 28A is again allowed to cool so that such flux is now trapped in area 30. It should be noted, however, that it would not matter, in the initiation of the operation, if the exterior field had been applied, before the superconductors reached their superconducting state so that when the superconducting state was reached, the external flux is already trapped in area 30 and other flux penetrable areas.

With flux now trapped in area 30, the superconducting piston 30P in superconducting state is then inserted into the area, to compress the flux about the piston 30P and heating wire 36 is energized to destroy superconductivity in the common extent 24A between area 30 and area 26. It should be noted that once heating wire 34 is turned off, trapping the flux in area 30, that it does not matter whether the superconducting piston 30P is inserted before, after, or simultaneously with the heating of wire 36 to destroy the superconductivity between the localized areas 30 and 26. Heating wire 36 is then de-energized, causing the localized extent between areas 30 and 26 to again become superconducting, and the flux driven from area 30 by the insertion of the piston 30P is now contained in area 26.

It will be understood that there has just been described a cycle in the operation of a flux pump stage. The steps just described may be repeated a number of times, if desired, to attain the desired flux density in area 26 and such steps will depend on the geometry of the design and the superconducting materials used and on the external field. It will be seen that there has now been provided, in area 26, a high flux density environment for the flux pump which area 26 surrounds.

With the desired flux density achieved in area 26 and extent 24A completely superconducting, heating wire 38 is heated to allow communication of the flux in area 26 to area 22.

Here it may be noted that, if desired, instead of first obtaining a given flux density in area 26 and then allowing some of it to go into area 22, until the flux equalizes; that during the flux pump operation first described, heating wires 36 and 38 may be turned on and off simultaneously, so that the operation of the pumping performed by piston 30P may simultaneously raise areas 26 and 22 to the desired flux density.

When the desired flux density is attained in area 22, heating wire 38 is de-energized allowing the superconductor 20A to become cooled, causing the flux in area 22 to be trapped therein. Heating wire 40 between area 22 from area 18 is energized causing superconductor 16A to become normal in a localized extent and, before or after such heating, the piston 22P in superconducting state is inserted in area 22 to drive the flux or compress it so that it moves into area 18. The steps now described may be repeated as many times as necessary to achieve the intended field in area 18, care being taken that the sequence of utilization of the heating wires and pistons is such that during operation, flux in area 18 can never communicate with flux in area 26, or area 26 with the exterior and that when piston 30P is inserted, that there is no communication for flux from area 30 to the exterior and when piston 22P is inserted there is no communication for flux from area 22 to area 26. The limits on operation will be that the flux density differential across any superconducting extent will not exceed the limits for the superconductor used, and within these limits, it will be appreciated that the flux density achievable in area 26 may be higher than the exterior by the critical flux current and temperature limitations of superconducting extent 24 while the flux density in area 18 may be higher than that in areas 26 or 22 (the latter when the piston 22P is removed) by the flux and temperature limitations of the superconducting material in the extent 16 or 16A. Here it must be appreciated that, so far, the superconducting materials available in extents of the type shown here, do not reach the values which would be expected from a short wire sample (of the order of 200 kilogauss) but have been found to be more in the vicinity of 20 kilogauss.

At this time niobium, niobium-zirconium, and niobium-tin are preferred metals for the superconducting material though it is believed that vanadium-gallium will become of increasing importance and in fact subject to the development of new superconducting materials and knowledge of their qualities and operation within the limits thereof, any superconducting material may be used within the limits of design and economy, including those listed in the book by Scott, referred to herein.

It should be appreciated that to reach increasingly higher levels in flux penetrable area 18 without increasing the flux density differential across any superconducting extent that the device may be expanded by providing a further triply connected superconducting member defining two areas, one of which would include and would be spaced from the periphery of superconducting members 24 and 28 to provide an area therebetween, and the other of which would provide an area for the reception of another superconducting piston. It will therefore be appreciated that this process may be carried on indefinitely to achieve the number of stages desired.

In FIGURE 1 the device will produce in area 18 a high flux density field, which is relatively uniform over substantially the height of the superconducting tube formed by material 16A and 16. If such uniformity is not required, the extents 16A and 16 and the extents 20, 20A, 24, 24A, 28 and 28A may be respectively made of members shallow in form so that the two or more triply connected members may be of shallow "pancake" or shallow form, measured in the general direction of the high field.

If a uniform or focussed or other extended field is desired, it should be appreciated that a number of superconductor members of pancake or shallow form measured in the general direction of the high field may be stacked one on top of another to achieve the desired high field path length.

In the operation of the device in FIGURES 1 and 2 it will be noted that, the operation shown may always be varied to allow when a piston is inserted, that all potentially superconducting extents inward of chamber receiving the piston, may be normal. At the same time, the superconductors separating such piston chamber from outer flux penetrable areas would of course be superconducting. Thus when piston 30P is inserted extent 28A would be superconducting while as many of extents 24A, 20A and 16A in that sequence, as desired may be normal.

Figure 3:
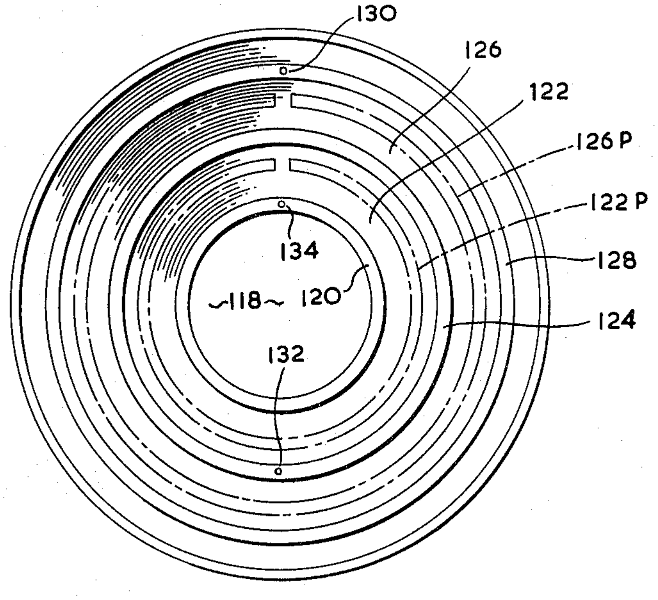
FIGURE 3 is a plan view of an alternative form of the device.

FIGURE 3 shows a plan view of a device which may be simpler to construct and operate, at least in small dimensions, than the device of FIGURES 1 and 2, but will not be as flexible in operation, and may be more expensive with large models. It will be assumed that the required helium cooling tank and means for operating the plugs and heating wires are available although not shown.

In FIGURE 3 is shown central flux penetrable area 118 and annular flux penetrable areas 122 and 126 located outwardly thereof. Area 118 is separated from area 122 by a superconducting annulus 120, area 122 is separated by superconducting annulus 124 from area 126, while the area 126 is separated from the exterior, by annular superconducting extent 128.

Heating wires 130, 132 and 134, are respectively embedded in extents 128, 124 and 120.

Superconducting annular plugs 122P ad 126P, both maintained by the helium in a superconducting state are retractably insertable in areas 122 and 126 respectively. Plugs 122P and 126P loosely sit in their respective areas, but are provided with gaps in their annular form, to allow the passage of flux from inside to outside the annulus when the plugs are in superconducting state.

In operation, a solenoid (not shown) creates a field about or below area 126. Whilst such field is existing, communication is established between the exterior and area 126 allowing flux to enter area 126. At this time piston 126P is removed.

With extent 128 again superconducting (solenoid power may then be turned off to avoid undue heating), piston 122P removed and extent 124 superconducting, the piston 126 P is inserted and heat applied through wire 132 to destroy superconductivity in part of extent 124, to raise the level of flux density in area 122. With piston 122P removed, the above steps of filling area 126 with flux, and pumping it into area 122, may be repeated as many times as desired to attain the flux density in area 122, intended within the critical field current and temperature limits of the superconducting material used.

Each time the area 122 is filled with flux to the intended density (with extent 124 completely superconducting), the heat may be applied through wire 134 to remove the superconductivity of extent 120 and plug 122P inserted to pump the flux into area 118. The process will be repeated until the flux density in area 118 has reached the limit desired and permitted by superconductor 120.

It will be noted that by proper design of the superconducting pistons, and, if necessary by leaving plug 126P in place during the attainment of high flux densities in area 118, that the flux about piston 126P in area 126 will form a high flux density environment for the flux pump utilizing areas 122 and 118.

The device shown in FIGURE 3, just as the design of FIGURE 2, may be expanded to as many stages as desired by the addition of superconducting annuli with corresponding heating wires and pistons, about those shown.

In the preferred embodiment, heating wires are used to provide localized destruction of superconductivity to allow communication of flux between adjacent flux penetrable areas. It will be understood that other means of heating might be used to destroy the superconductivity in such localized areas. Further it will be recalled that the materials used have critical flux density fields above which the superconductivity of the material will be destroyed. Therefore the use of heat to reduce superconductivity in localized areas may be replaced by the use of localized fields of predetermined flux density sufficient that in combination with the fields created in the operation of the device, that they will in a location corresponding to the desired communication, be sufficient to carry the field at such location above the critical limit to allow communication of the flux. In FIGURES 1 and 2, coils 39 are indicated, which may, if desired, be placed over walls 16A, 20A, 28A and 24, and connected to an electric supply outside the tank, such coils 39 being available, when energized, to assist in creating a critical field.

It will be appreciated that the superconducting extents shown, must provide closed connections, but may be as shallow as desired. However, it will be understood that if a uniform field is required over an appreciable length, then the superconductor or superconductors defining area 18 or area 118 must collectively define flux penetrable areas having as long and preferably somewhat longer length; and that in certain applications, some attention must be paid to end effects.

In general, whether the device in accord with the invention, has the number of pumping areas shown in FIGURES 1 or 2, or many more, a great flexibility is available in the state of interconnection of flux penetrable areas located inwardly of any given piston chamber. With any such device, at the time of insertion of a piston in a chamber, the superconducting extents outwardly defining the chamber must be in their superconducting state, to ensure that the flux will be pumped inward. However some, any or all of the superconducting extents separating flux penetrable areas, and located inwardly of the piston chamber in question, may be normal when the piston is inserted in such chamber, so that for example, the flux may be pumped from such chamber simultaneously into as many such interconnected areas as desired. The number of interconnected inward areas simultaneously receiving flux from a given piston chamber will vary in accord with design considerations of the sequence of operations and geometry of the device.

There is herein described, therefore, a device which offers the possibility of higher filed strengths or high field strengths at economical cost, than the superconducting wire electromagnet, because the latter suffers from the expense and complexity of design particularly to avoid failure in long lengths of wire, whereas the device described herein effectively consists of several short lengths of superconductor which may be separately adjusted for optimum performance. Thus a poor pump stage may add little to the ultimate field but will not diminish it. Moreover, it will be noted that if one pump section goes normal, it may decrease the field somewhat, but will not necessarily switch the entire device normal unless each successive stage is operated at or near its critical limit. The device therefore is more advantageous than attempting to divide an electromagnet coil into several coils and endeavouring to optimize each one separately.

In addition, the device shown, acts as its own magnetic shield and by controlling the pumping, very good control of the ultimate magnetic field can be obtained.

The device by flexibility of design of the areas, lends itself to provision of non-uniform or conversely uniform fields.

I claim:

1. A device for creating a high magnetic field comprising: extents of superconductor defining and surrounding a pair of flux penetrable areas, means for pumping flux from one of said areas to the other, a third flux penetrable area surrounding the exterior portions of said extents, a further extent of superconductor surrounding said third flux penetrable area, means located outside said pair of flux penetrable areas for pumping flux into said one of said areas, means for maintaining said superconductors below their critical temperature and means for selectively causing said superconductors to become normal, in parts of: said further extent, extents separating said third from said one flux penetrable area and the extent separating said one from said other flux penetrable area.

2. A device for creating a high magnetic field comprising: extents of superconductor defining and surrounding a pair of flux penetrable areas, means for pumping flux from one of said areas to the other, a third flux penetrable area separated from said one area by a superconductor and bordered by a superconductor, means for creating high magnetic fields in said third flux penetrable area, means selectively allowing communication for flux between said third flux penetrable area and said one area, and means for maintaining said superconductors below their critical temperature.

3. A device as claimed in claim 2 including a flux penetrable area defined by a superconducting extent between the superconducting material defining said other flux penetrable area, and fields exterior to the device.

4. Means for producing high magnetic fields comprising: a first triply connected body of superconductor enclosing first and second flux penetrable areas, a second triply connected body of superconductor enclosing third and fourth flux penetrable areas located in but spaced from the superconductor defining said second area, means for maintaining said superconductors in a superconducting state, means for reversibly effectively reducing the area of said first flux penetrable area, means for reversibly, effectively reducing the area of said third flux penetrable area, individually reversibly operable means for destroying the superconductivity of superconductors:

(a) solely defining said first area (b) separating said first and second areas (c) separating said second area outside said third area, from said third area (d) separating said third from said fourth area.

5. Means as claimed in claim 4 wherein said means for effectively reversibly reducing the area of said first and third flux penetrable areas, respectively consists of pistons of superconductor, insertable in said first and third areas respectively.

6. A device as claimed in claim 1 wherein said means for causing superconductor extents to become normal comprises heating means.

7. A device as claimed in claim 1 wherein said means for causing superconductor extents to become normal comprises a means for creating a localized magnetic field in said extents.

References Cited by the Examiner

UNITED STATES PATENTS 3,156,850 11/1964 Walters ------------ 317—158

OTHER REFERENCES

Hildebrandt et al.: Journal of Applied Physics, vol. 33, No. 2, July 1962, QC–1–J82 (pages 2375–2377 relied on).

BERNARD A. GILHEANY, *Primary Examiner.*

JOHN F. BURNS, *Examiner.*

GEORGE HARRIS, JR., *Assistant Examiner.*